THRESHOLD DETECTOR EMPLOYING A SHUNT CONNECTED TUNNEL DIODE

Filed Aug. 25, 1965

INVENTOR.
KEITH E. CLOSE
BY S. C. Yeaton
ATTORNEY

INVENTOR.
KEITH E. CLOSE
BY
S. C. Yeaton
ATTORNEY

United States Patent Office 3,453,448

Patented July 1, 1969

3,453,448

THRESHOLD DETECTOR EMPLOYING A SHUNT CONNECTED TUNNEL DIODE

Keith E. Close, Phoenix, Ariz., assignor to Sperry Rand Corporation, a corporation of Delaware Filed Aug. 25, 1965, Ser. No. 482,356

Int. Cl. H03k *17/58*

U.S. Cl. 307—235 7 Claims

ABSTRACT OF THE DISCLOSURE

An electronic analog of a mechanical relay in which an input signal is applied to a tunnel diode through a series resistor selected so that an input voltage exceeding a predetermined threshold will switch the tunnel diode into its high voltage state. A cyclical resetting means shunted across the tunnel diode periodically shorts out the diode so as to return it temporarily to its low voltage state. When the input voltage subsequently drops below the threshold value, the tunnel diode will return and remain in the low voltage state.

This invention relates to threshold detectors and more particularly to electronic relay circuits having precisely controlled pull-in and drop-out thresholds.

It is frequently necessary to provide circuits which are responsive to a specified threshold voltage. These circuits respond to an input voltage that exceeds the specified threshold, but remain inactive when the input voltage remains below the specified threshold. Such circuits are analogous to conventional electromagnetic relays. Frequently, electronic circuits are preferred for this purpose because of their increased speed and reliability. The usefulness of such electronic circuits is frequently limited, however, because the pull-in voltage and the drop-out voltage are governed by independent characteristics.

In one type of electronic relay circuit, for instance, the unknown input signal is applied constantly to a tunnel diode through a series resistor. For low values of input signal, the tunnel diode circuit remains in its low voltage state. When the input signal is sufficient to exceed the peak point of the tunnel diode, the circuit switches to its high voltage state or "pulls in." Under these conditions, the diode operates in a region beyond its valley point. As the input signal is lowered, the operating point drops below the valley point and the circuit switches to the low voltage state of "drops out."

Since pull-in in such circuits depends on the peak point and drop-out depends on the valley point, a considerable differential or "hysteresis" exists between these points.

Furthermore, since the characteristic curve of a tunnel diode changes markedly with temperature in the valley region of the curve, the pull-in to drop-out ratio becomes temperature sensitive.

It is an object of the present invention to provide a threshold circuit in which precise threshold values may be maintained throughout a wide variation of ambient conditions.

It is another object of the present invention to provide a threshold circuit in which the pull-in and drop-out voltages can be made substantially equal.

It is another object of the present invention to provide a threshold circuit in which the pull-in to drop-out ratio can be adjusted within wide limits.

It is still another object of the present invention to provide a threshold circuit which is operable with bipolar input signals.

It is yet another object of the present invention to provide a threshold circuit which is relatively simple and inexpensive to fabricate.

These and other objects are achieved by using a tunnel diode as a stable reference, periodically comparing the unknown signal level with the peak point of the tunnel diode, removing the voltage across the tunnel diode between comparisons, and providing an output signal whose presence or absence is governed solely by the results of the periodic comparisons.

The principles and operation of the present invention may be understood by referring to the following description and the accompanying drawings.

Figure 1:
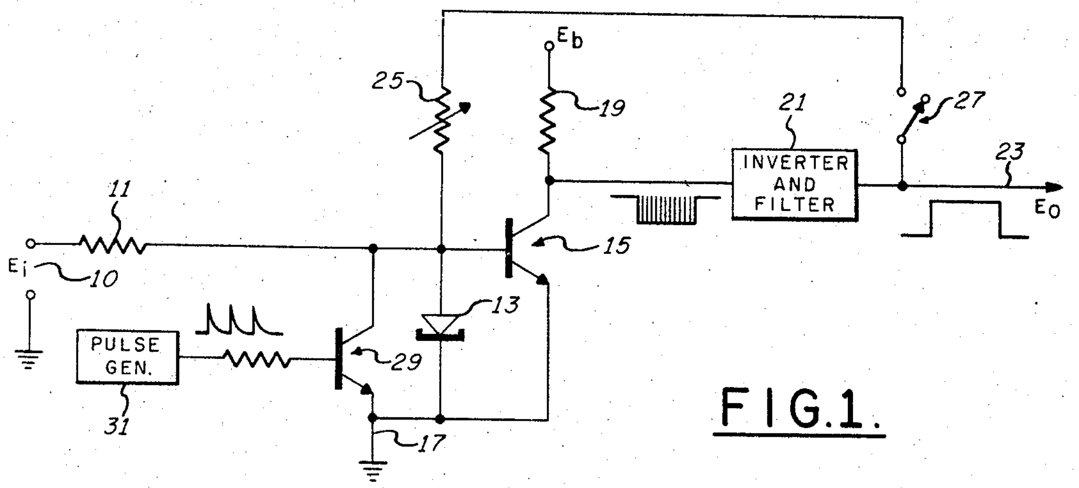
FIG. 1 is a circuit diagram illustrating one embodiment of the invention.

Referring now to FIG. 1, an unknown input signal is applied to a pair of input terminals 10. The signal passes through a series resistor 11 to a tunnel diode 13. The voltage across the diode 13 is applied to the base of a switching transistor 15 whose emitter is connected to a ground point 17 and whose collector is connected to a suitable voltage supply through a load resistor 19. The collector voltage is passed through an inverter and filter 21 and appears as an output voltage $E_o$ on an output terminal 23.

The inverter and filter unit 21 is intended to be a schematic representation. In many circuits, inversion will be accomplished internally. Two stages of amplification may be employed, for instance, or an emitter follower may be used in a given circuit. In some instances a signal inversion may be desired. Similarly, in some instances, filtering may not be necessary or desired.

The output voltage may be fed back to the tunnel diode through a feedback resistor 25 and a feedback switch 27 if desired. A reset transistor 29 is shunted across the tunnel diode. The reset transistor is driven to saturation periodically by a pulse generator 31. The pulse generator typically provides a signal with a pulse repetition rate of 5 kc. and a magnitude such that the tunnel diode is periodically shorted out of the circuit during the existence of each pulse from the generator. The reset transistor and the pulse generator constitute a resetting means.

Figure 2:
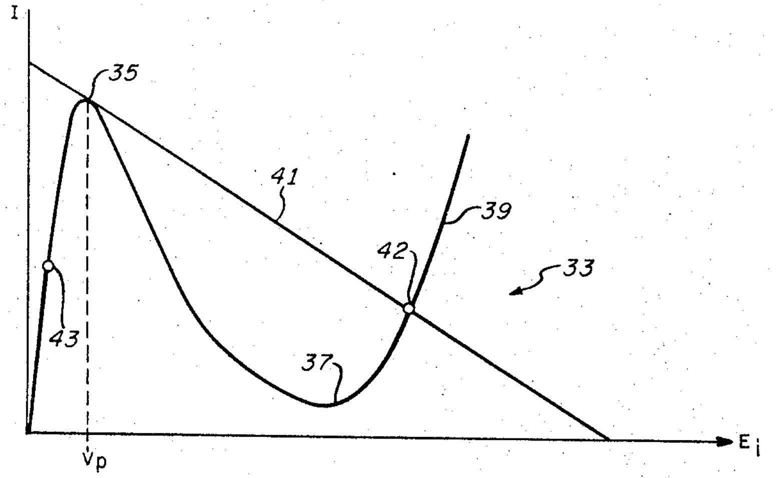
FIGS. 2–4 are diagrams useful in explaining the operation of the circuit of FIG. 1.

The operation of the circuit can be understood by referring to FIG. 2 and assuming that the feedback switch 27 is open.

FIG. 2 depicts a typical S-shaped tunnel diode characteristic curve. This characteristic curve illustrates that as a voltage across the tunnel diode is raised from a zero level, the current through the diode increases throughout its initial conductance region until the diode current reaches a peak point current 35. This occurs at a peak point voltage designated as $V_p$ in FIG. 2. As the input voltage continues to rise, the tunnel diode current next decreases through a negative conductance region, until this current reaches a minimum at the valley point 37. Further increases in voltage across the tunnel diode cause the current to again increase through its normal diode region 39.

The series resistor 11 absorbs some of the input voltage so that the voltage actually applied to the tunnel diode is somewhat less than the input voltage. The voltage and current relationships can be visualized by constructing a conventional load line 41. This load line has a constant slope determined by the resistance of the series resistor. The positioning of the load line is determined by the applied voltage $E_i$. As the applied voltage is increased, the load line moves outward along the voltage axis and the current through the tunnel diode increases from zero as indicated by the intersection of the load line and the tunnel diode characteristic. When the unknown input signal reaches the specified threshold value, the intersection of the load line with the characteristic curve of the tunnel diode reaches the peak point 35. The circuit switches from the low voltage state to the high voltage state so that the resultant current flow is determined by the intersection of the load line and the characteristic curve at a point 42. Further increases in input voltage will cause the current to rise along the normal diode portion of the charactristic curve as the load line continues to move outward.

The series resistor is chosen to have a magnitude such that the point 42 occurs at a voltage level sufficient to saturate the switching transistor 15. When the diode circuit is in the low voltage state, the transistor will be maintained in a cut-off condition.

Assume now, that a relatively steady D.C. input voltage is applied to the circuit. If this voltage is below the threshold it can be represented by a point moving up the characteristic curve from zero to a point such as 43. Since this is below the peak point 35, the diode will not switch to the high voltage state. When the resetting means shorts out the tunnel diode, the diode current will return to zero, and when the resetting means reopens, the current will again build up along the initial conductance portion of the characteristic curve.

Assume now that the input signal has increased so that the diode current exceeds the peak point 35. When the resetting means opens, the tuunel diode current builds up from zero. When the current attempts to exceed the peak point current, the tunnel diode circuit will switch to a high voltage condition and operation will resume from the point 42. This will saturate the switching transistor 15 and provide an output signal $E_o$. Shortly after this occurs, however, the resetting means will again short out the tunnel diode and return the circuit operation to the zero point of the characteristic curve. When the resetting means reopens, it again permits normal operation of the tunnel diode. The diode circuit will again be switched to the high voltage state or will remain in the low voltage state depending upon the magnitude of the input signal at that time.

Thus if the input signal remains above the threshold, a signal will be obtained at the collector of the switching transistor 15 which consists of a group of unidirectional pulses and which persists until the input signal again drops below the threshold. These pulses may be filtered if desired so as to appear as a unitary pulse at the output terminal 23.

Figure 3:
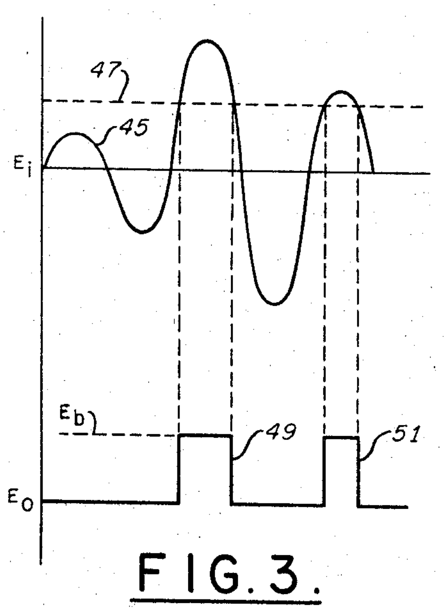

The circuit of FIG. 1 may be used with variable amplitude A.C. signals as well as variable D.C. signals as illustrated in FIG. 3.

In FIG. 3, an A.C. input signal will not switch the tunnel diode if this signal is below the threshold 47 so that the diode current fails to penetrate to the peak point of the diode characteristic. The circuit, however, will provide ouput signals 49–51 during the time that the A.C. input signal exceeds the threshold.

It will be seen that in either event, the circuit will pull-in when the input signal is sufficient to cause the diode current to exceed the peak point and will drop-out when the input signal becomes insufficient to cause the diode current to exceed the same peak point. The presence or absence of an output signal is essentially independent of the shape and position of the characteirtistic curve in the valley region.

Since the peak point is relatively stable, this provides a precise output which is largely independent of temperature. In prior art circuits, drop-out occurs when the intersection of the load line and the characteristic curve in the valley region drops below a given value. Since the characteristic curve in this region is temperature sensitive, the drop-out threshold value becomes temperature sensitive.

The present invention on the other hand not only provides means to obtain a unity pull-in to drop-out ratio by using the peak point as the datum regardless of whether the circuit is originally in the pulled-in or dropped-out condition, but also provides a datum that remains at a specific value even during ambient temperature fluctuations.

In situations in which a pull-in to drop-out ratio different from unity is desired, the feedback loop is inserted in the circuit by closing the feedback switch 27.

With the feedback circuit in operation, a portion of any output signal is added to the input signal so that once the circuit has pulled-in, it will not drop-out until the input signal falls to a definite fraction of the threshold voltage.

Figure 4:
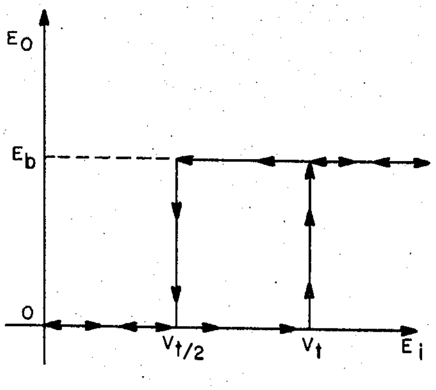

As an illustration of this operation, consider the diagram of FIG. 4. This figure depicts a hysteresis curve applicable to the circuit of FIG. 1 when the feedback resistor is adjusted to provide a two-to-one pull-in to drop-out ratio.

When the input signal is first applied, the diode current increases from zero to some point such as the point 43 in the initial conductance region of the characteristic curve of FIG. 2. If the input signal is insufficient to cause the diode current to reach the peak point, the circuit cannot switch to the high voltage state. The circuit then provides no output signal. Consequently, there is no feedback signal at this time. The diode current will continue to alternate between zero and the point 43 in response to the opening and closing of the resetting means.

When the input signal exceeds the threshold $V_t$, however, the diode circuit switches to the high voltage state and the output voltage is obtained. This will be substantially equal to the supply voltage $E_b$ as indicated in FIG. 4. The output signal now provides a feedback signal. Because of the filtering action, the output and feedback signals appear as unitary pulses despite the pulsations caused by the action of the reset means.

Since the signal applied to the tunnel diode is now representative of the sum of the feedback signal and the output signal, the circuit will remain in the pulled-in condition until the input signal drops to a predetermined fraction of the threshold value. In the example previously assumed, the feedback resistor was chosen to provide a feedback signal such that the circuit will drop out when the input signal falls below one half the threshold value. When this occurs, the normal operation of the resetting means returns the diode current to zero, and when the resetting means again permits a signal to be applied to the tunnel diode, this total signal will remain below the peak point, so that the output signal will disappear.

Even though the pull-in to drop-out ratio with this circuit is adjustable, a selected ratio is maintained at a precise value because it is dependent only upon the relatively stable peak point of the diode.

Figure 5:
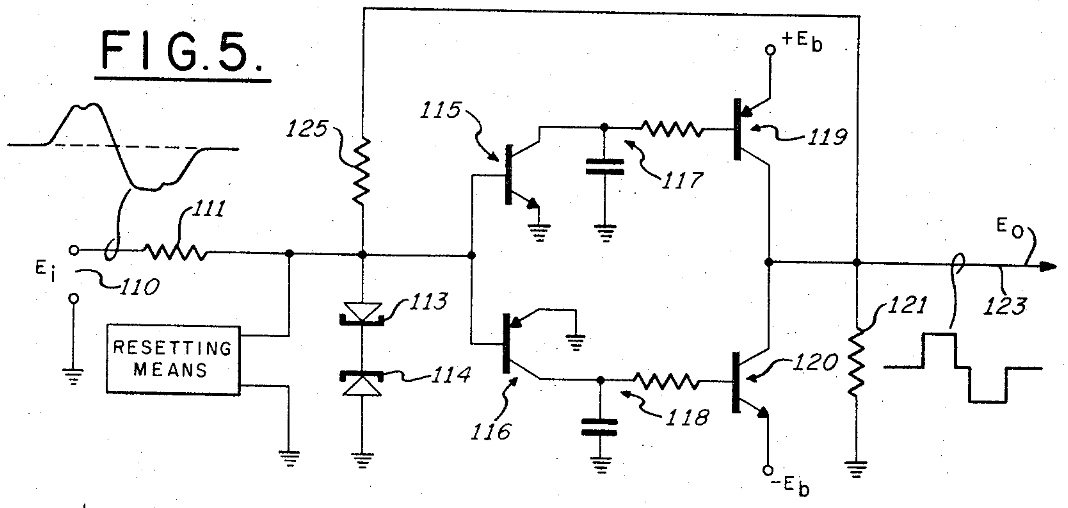
FIG. 5 is a circuit diagram illustrating an embodiment of the invention useful when a bipolar input signal is to be measured.

The basic circuit of FIG. 1 can be expanded to provide bipolar operation as illustrated in FIG. 5. In this circuit an input signal is applied to a pair of input terminals 110, and through a series resistor 111 to a pair of tunnel diodes 113 and 114. The diodes are connected in an inverse series relationship so that the positive voltage applied to the input terminals will drive the diode 113 into the forward portion of its characteristic and the diode 114 into the reverse portion of its characteristic. Conversely, a negative voltage applied to the input terminals will drive the transistor 114 into the forward portion of its characteristic and the transistor 113 into the reverse portion of its characteristic. Since the reverse characteristic of a tunnel diode displays a relatively high and linear conductivity the combination of the two tunnel diodes effectively displays an appropriate S-shaped characteristic for either polarity of the input signal. The voltage across the tunnel diodes is applied to the base electrodes of each of a pair of opposite conductivity type input switching transistors 115 and 116. The collector terminals of these transistors are connected to resistance-capacitance filter networks 117 and 118 respectively. The outputs of these filter networks are applied to the output switching transistors 119 and 120. The combined signal from these transistors is applied across a load resistor 121 where it appears as an output signal at the output terminal 123.

This signal is also applied to a feedback loop in which the magnitude of a feedback resistor 125 determines the pull-in to drop-out ratio of the circuit. A resetting means periodically shorts out the tunnel diodes so as to return the tunnel diode current to zero before the following comparison is made.

As long as the input signal to this circuit remains below the threshold value, no output signal will be obtained. A positive-going or negative-going output signal will be obtained whenever a corresponding positive-going or negative-going input signal in excess of the appropriate threshold is received. An output signal will remain until the input signal falls below the drop-out limit, determined by the magnitude of the feedback resistor.

Figure 6:
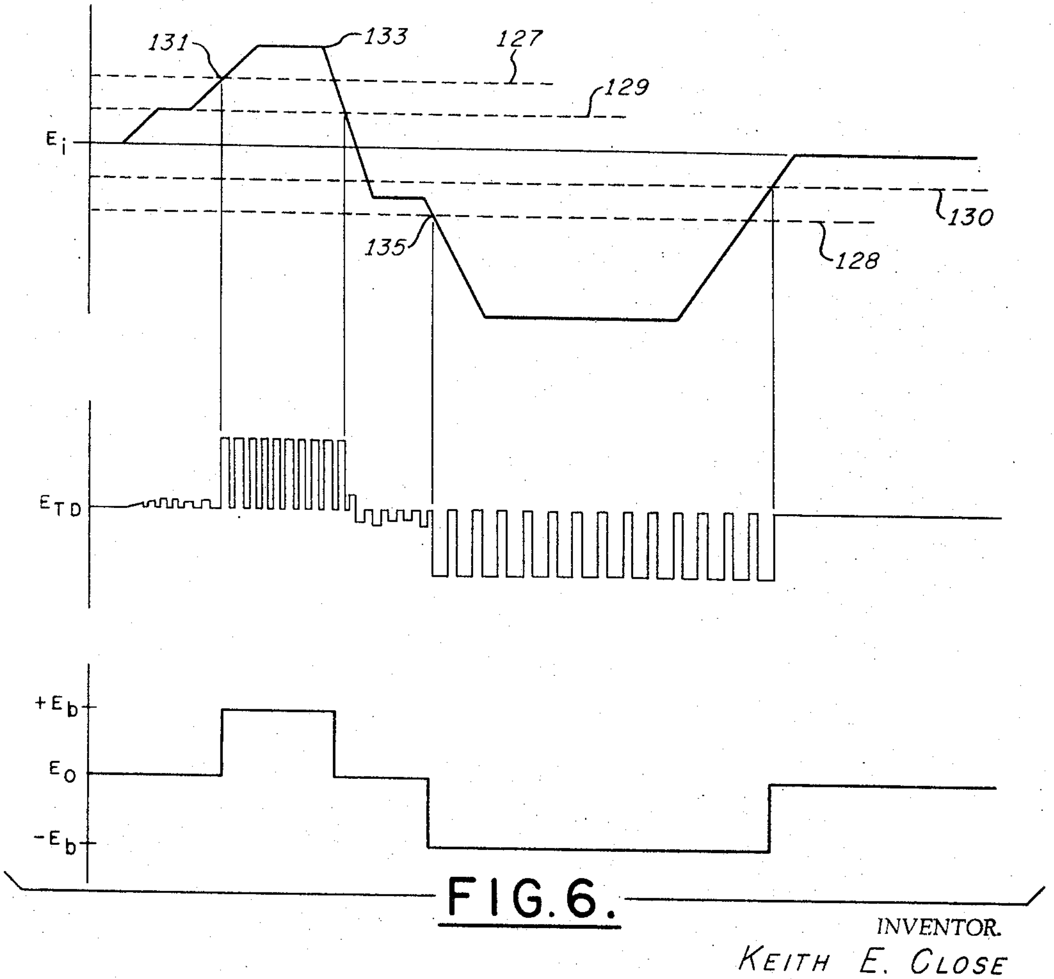
FIG. 6 is a diagram useful in explaining the operation of the circuit of FIG. 5.

The operation of the circuit can be understood by referring to FIG. 6 which depicts a hypothetical input voltage, $E_i$, as well as the resulting voltage across the tunnel diode, $E_{td}$, and the output voltage, $E_o$.

FIG. 6 illustrates a situation in which a two-to-one pull-in to drop-out ratio has been selected. The curve of the input voltage includes indications of the pull-in thresholds 127 and 128 as well as the drop-out limits 129 and 130.

As the input signal increases from zero, the voltage across the tunnel diodes increases accordingly. The voltage across the tunnel diodes has a serrated outline indicating the periodic interruptions caused by the resetting means. The tunnel diode voltage remains low during the time that the input voltage remains below the threshold. Since the tunnel diode voltage is below the peak point, the input switching transistor 115 remains cut off. The transistor 116 also remains cut off because whatever voltage is applied to its base electrode is of the wrong polarity to permit conduction. There is no output signal $E_o$, under these conditions.

At point 131, however, the input signal penetrates the threshold 127. The tunnel diode 113 switches to its high voltage state, saturating the transistor 115 and driving the transistor 116 farther into its cut off condition. A positive output signal appears at the terminal 123 under these conditions.

A positive output signal also provides a positive feedback voltage which adds to the input voltage being applied to the tunnel diodes.

At point 133, the input voltage begins to decrease in magnitude. When the input signal descends through the threshold 127, the added feedback voltage is sufficient to maintain the tunnel diode circuit in its high voltage condition. It is only when the input voltage falls below the drop-out limit 129 that the sum of the feedback voltage and the input voltage becomes insufficient to drive the tunnel diode 113 beyond its peak point. The circuit reverts to the low voltage state and the tunnel diode voltage is insufficient to saturate either input switching transistor. The ouput volage terminates. Only low voltage pulses appear across the tunnel diodes.

As the input voltage becomes negative, the tunnel diode 114 becomes biased in its forward direction. However, the negative input voltage does not penetrate the threshold 128 until the point 135 is reached. This saturates the input switching transistor 116 and ultimately produces a negative output voltage at the terminal 123. The resulting feedback voltage now has a negative polarity so that it again adds to the input voltage. The sum of these two voltages acts to retain the output signal until the input voltage has again dropped below the drop-out limit 130.

Although a two-to-one pull-in to drop-out ratio has been assumed, it will be appreciated that this ratio was selected for purposes of illustration only. The ratio may be varied within wide limits or the feedback may be eliminated so as to provide pull-in and drop-out at the same level.

The circuits have been illustrated as being referred to ground for purposes of convenience. In some applications, reference voltages other than ground may be desired. Situations may arise, for instance, in which it is desired to use the circuit of FIG. 5 with input signals that always remain positive. In these situations, a circuit is desired in which no output signal is provided while the input voltage remains within certain limits defining a "dead zone," but a positive-going output signal is required when the input voltage exceeds a given maximum and a negative-going output signal is required when the input voltage falls below a given minimum. This mode of operation can be obtained by returning the various ground reference points to a suitable positive voltage within the "dead zone."

In some situations it may be desired to return the tunnel diode to a specific voltage other than ground. Such a configuration may be used to provide an offset voltage. This will provide a modified threshold point in the circuit of FIG. 1 or asymmetric operation in the circuit of FIG. 5.

In some instances, it may be desirable to provide different pull-in to drop-out ratios for positive and negative-going input signals respectively. This may be accomplished by providing two feedback loops with a different value of feedback resistor in each loop and rectifying means for passing positive signals in one loop and negative signals in the other loop.

Although the circuits described herein have employed switching transistors, alternative devices may be substituted for these elements. Silicon controlled rectifiers or electron tubes, for instance, may be used instead of these transistors.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A threshold detector comprising a pair of input terminals; a voltage reference point; a tunnel diode having first and second electrodes, said first electrode being connected directly to said voltage reference point; a resistor serially connecting one of said input terminals to said second electrode; a reset transistor having its output terminals connected directly across said tunnel diode; a pulse generator arranged to saturate said reset transistor repetitively at a rate which is high with respect to the expected changes in the signal to be received; a switching transistor having its input terminals connected across said tunnel diode; said resistor having a magnitude such that the voltage appearing across the tunnel diode when in its high voltage state is sufficient to saturate said switching transistor; and a signal output terminal connected to receive signals indicative of the conductivity state of the switching transistor.

2. A threshold detector comprising input means; a tunnel diode; a resistor serially connecting said input means to said tunnel diode; a reset transistor having its output terminals connected across said tunnel diode; a pulse generator aranged to saturate said reset transistor repetitively at a rate which is high with respect to the expected changes in the signal to be received; a switching transistor having its output terminals connected across said tunnel diode; said resistor having a magnitude such that the voltage appearing across the tunnel diode when in its high voltage state is sufficient to saturate said switching transistor; and feedback means connected to add a selected portion of any converted signal appearing at said signal output terminal to the input signal being applied to said tunnel diode.

3. A threshold detector comprising input means; a tunnel diode; a resistor serially connecting said input means to said tunnel diode; a reset transistor having its output terminals connected across said tunnel diode; a pulse generator arranged to saturate said reset transistor repetitively at a rate which is high with respect to the expected changes in the signal to be received; a switching transistor having its output terminals connected across said tunnel diode; said resistor having a magnitude such that the voltage appearing across the tunnel diode when in its high voltage state is sufficient to saturate said switching transistor; means to convert signals appearing at the output of said switching transistor to signals having the same polarity as the input signal; and feedback means connected to add a selected portion of any converted signal from the signal output terminal to the input signal being applied to said tunnel diode.

4. A threshold detector for providing an output signal of a first polarity if an input signal exceeds a quiescent level by more than a specified threshold value and an output signal of a second polarity if an input signal falls below the quiescent level by more than the specified threshold value comprising input means; a pair of tunnel diodes conected in inverse series relationship; a series resistor connecting said input means and said tunnel diodes in series relationship; a bipolar saturable switching means responsive to the voltage across said tunnel diodes; said series resistor having a magnitude small enough so that the tunnel diode will be switched to its high voltage state when the input voltage deviates from the quiescent level by more than the sepcified threshold, said series resistor further having a magnitude that is large enough to provide a tunnel diode voltage that will saturate said switching means when a tunnel diode is switched to its high voltage state; output means connected to receive the output of said switching means; and feedback means connected to add a selected portion of an output signal to the input signal being applied to said tunnel diodes.

5. A threshold detector for providing a positive-going output signal in response to an input signal that deviates from a quiescent level by more than a specified threshold value in one sense and for providing a negative-going output signal in response to an input signal that deviates from a quiescent level by more than a specified threshold value in the opposite sense comprising an input means; a pair of tunnel diodes connected in inverse series relationships; a series resistor connecting said input means and said tunnel diodes in a series relationship; resetting means for periodically shorting out said tunnel diodes at a rate which is high with respect to the rate of expected changes in the input signal; a bipolar switching means; first and second saturable means in said switching means capable of being saturated in response to positive-going and negative-going switching signals respectively; means to apply a voltage existing across said tunnel diodes to the input of said switching means; said series resistor having a magnitude large enough to provide tunnel diode voltages sufficient to saturate said saturable means when a tunnel diode is in the high voltage state; a positive feedback loop connected between the output of said switching means and said tunnnel diodes; a resistor in said loop adjusted to feed back an output signal having a magnitude that is a predetermined fraction of the appropriate threshold value; and means to couple an output signal from said switching means to exterior utilization means.

6. A threshold detector comprising input means; a pair of tunnel diodes connected in inverse series relationship; a series resistor connected between said input means and said tunned diodes; resetting means for repetitively shorting out said pair of tunnel diodes; first and second input switching transistors, said first and second input switching transistors being of opposite conductivity types; means to apply the voltage across said tunnel diodes to the input terminals of said input switching transistors; filtering mean connected to the output terminals of said input switching transistors; first and second output switching transistors connected to receive signals through said filtering means from said first and second input switching transistors repectively, each of said output switching transistors being of a conductivity type opposite that of the corresponding input switching transistor; a signal output terminal connected to corresponding electrodes of both of said output switching transistors; and a feedback means connected between said signal output terminals and the junction of said series resistor and said tunnel diodes.

7. A threshold detector comprising input means; a pair of tunnel diodes connected in inverse series relationship; a series resistor connected between said input means and said tunnel diodes; resetting means for repetitively shorting out said pair of tunnel diodes; first and second input switching transistors, said first and second input switching transistor being of opposite conductivity types, means to apply the valve across said tunnel diodes to the base electrodes of said input switching transistors; filtering means connected to the collector electrodes of said input switching transistors; first and second output switching transistors having their base electrodes connected to receive signals through said filtering means from said first and second input switching transistors respectively, each of said output switching transistors being of a conductivity type opposite that of the corresponding input switching transistor; a signal output terminal connected to the emitter electrodes of both of said output switching transistors; and feedback means connected between said signal output terminal and the junction of said series resistor and said tunnel diodes.

References Cited

UNITED STATES PATENTS

| | | | |
|---|---|---|---|
| 3,164,826 | 1/1965 | McGrogan | 307—235 X |
| 3,187,197 | 6/1965 | Ekiss | 307—206 |
| 3,349,251 | 10/1967 | Wilder | 307—88.5 |

ARTHUR GAUSS, *Primary Examiner.*

J. D. FREW, *Assistant Examiner.*

U.S. Cl. X.R.

307—231, 258, 274, 286; 328—150, 168, 175